United States Patent [19]

Becker et al.

[11] 4,098,746
[45] Jul. 4, 1978

[54] AQUEOUS VINYL ESTER COPOLYMER DISPERSIONS CAPABLE OF BEING CROSS-LINKED

[75] Inventors: Knut Henning Becker, Darmstadt; Karl Josef Rauterkus; Detlev Seip, both of Kelkheim, Taunus, all of Fed. Rep. of Germany

[73] Assignee: Hoechst Aktiengesellschaft, Frankfurt am Main, Fed. Rep. of Germany

[21] Appl. No.: 534,376

[22] Filed: Dec. 19, 1974

[30] Foreign Application Priority Data

Dec. 22, 1973 [DE] Fed. Rep. of Germany ....... 2364364

[51] Int. Cl.$^2$ ............................................. C08L 61/20
[52] U.S. Cl. ...................... 260/29.4 UA; 260/29.6 R; 260/29.6 F; 260/29.6 RW; 260/29.6 TA; 260/29.6 H; 260/29.6 N; 260/29.6 MN
[58] Field of Search .............. 260/29.4 UA, 29.6 TA, 260/29.6 RW, 29.6 MN, 29.6 N, 29.6 H, 29.6 CM, 80.81, 87.1, 23 R, 23 C, 23 P, 29.2 P, 29.2 N; 526/292

[56] References Cited

U.S. PATENT DOCUMENTS

| 2,914,513 | 11/1959 | Daniel, Jr. ........................... 526/192 |
| 2,959,821 | 11/1960 | Kolb ............................ 260/29.6 MN |
| 3,732,190 | 5/1973 | Balle et al. .................... 260/29.6 TA |

FOREIGN PATENT DOCUMENTS

2,223,630  12/1973  Fed. Rep. of Germany .... 260/80.71

*Primary Examiner*—J. Ziegler
*Attorney, Agent, or Firm*—Curtis, Morris & Safford

[57] ABSTRACT

Aqueous dispersions of copolymers consisting of 50-99.9% by weight of a vinyl ester of a saturated monocarboxylic acid having from 1 - 18 carbon atoms, 0.1 - 15% by weight of an α-haloalkane carboxylic acid vinyl ester of the formula

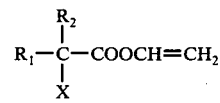

wherein $R_1$ is hydrogen, a halogen atom or an alkyl radical having 1 - 16 carbon atoms, $R_2$ is hydrogen, a halogen atom or an alkyl radical having 1 - 13 carbon atom and X is a halogen atom, and 0 - 49.9% by weight of at least one other ethylenically unsaturated monomer which can be cross-linked while drying with 0.05% to 10% by weight calculated on the total mixture of an aminoplast resin, a polyamine, a polyamidoamine or a mixture of Formaldehyd and ammonia or an amine. The mixture of the dispersion and the cross-linking agent is stable, and cross-linking will start only when the mixture is applied to a substrate such as a fiber.

4 Claims, No Drawings

AQUEOUS VINYL ESTER COPOLYMER DISPERSIONS CAPABLE OF BEING CROSS-LINKED

The present invention relates to aqueous copolymer dispersions capable of being cross-linked and consisting of vinyl esters, an α-haloalkane carboxylic acid vinyl ester and optionally further ethylenically unsaturated monomers.

Aqueous dispersions of copolymers capable of being cross-linked are well known. Substantially there are two methods of cross-linking: cross-linking by incorporating multifunctional monomers such as diallyl compounds, diacrylates or dimethacrylates by polymerization or subsequent cross-linking by incorporating by polymerization reactive monomers such as hydroxy, epoxy, halohydrine or activated halogen compounds. In the first method of cross-linking copolymers are obtained having a certain amount of cross-linking which cannot be modified subsequently. Furthermore the latex particles are less fluid in the case of a preliminary cross-linking to a certain extent so that an adequate film formation cannot be assured. The subsequent cross-linking of copolymers having incorporated reactive monomers has the advantage that the amount of cross-linking may be adjusted in controlled manner. Examples of such processes are the cross-linking of N-methylol groups containing polymers by acids or heat and of epoxide groups containing copolymers with diamines. The incorporation of activated chlorine-containing monomers into copolymers for the purpose of a subsequent cross-linking has been described several times, for example, in German Pat. Specification No. 1,204,407, in French Pat. Specification No. 2,007,881 and in German Offenlegungsschrift No. 2,110,190. In said cases the copolymer was however first isolated and cross-linked at higher temperatures after the addition of cross-linking agents, catalysts or accelerators, fillers and further additives, giving elastomeric moulding compounds. Alkaline acrylic ester copolymer dispersions having incorporated haloalkane carboxylic acid vinyl ester groups are specified in German Offenlegungsschrift No. 2,223,630. The method of cross-linking disclosed in ols 2,223,630 is however disadvantageous, for example, in the case of polymers rich in vinyl acetate owing to the fact that a saponification of the ester groups easily takes place through the action of alkalies. More than 50 mol % copolymers of haloalkane carboxylic acid vinyl esters are described in German Offenlegungsschriften Nos. 1,472,797; 1,597,513; 1,914,057 and 1,914,558. The aforesaid polymers were prepared partially by subsequent reaction of hydroxyl group containing polymers with halocarboxylic acids, partially by copolymerization with haloalkane carboxylic acid vinyl esters. The copolymerization of haloalkane carboxylic acid vinyl esters in a greater amount has the disadvantage that the halogen component has a molecular weight reducing effect.

It has now been found that aqueous copolymer dispersions of from 70 to 30% by weight of water and 30 to 70% by weight of a copolymer of from 50 to 99.9% by weight of at least one vinyl ester of a saturated aliphatic monocarboxylic acid having from 1 to 18 carbon atoms, 0.1 to 15% by weight of an α-haloalcane carboxylic acid vinyl ester of the formula (I)

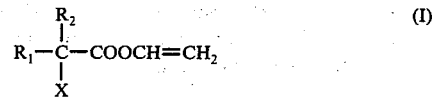

$$R_1 - \underset{\underset{X}{|}}{\overset{\overset{R_2}{|}}{C}} - COOCH = CH_2 \quad (I)$$

wherein $R_1$ may represent hydrogen, a halogen atom or an alkyl radical having from 1 to 16 carbon atom, $R_2$ is hydrogen, a halogen atom or an alkyl radical having from 1 to 13 carbon atoms and X is a halogen atom and of from 0 to 49.9% by weight of at least one further ethylenically unsaturated monomer may be advantageously cross-linked in the form of their dried polymer films by adding from 0.05 to 10% by weight calculated on the total mixture of an aminoplast resin, a polyamine, a polyamidoamine or a mixture of formaldehyde and ammonia and/or amines.

The copolymer dispersions contain polymers having a surprisingly high molecular weight. They are film-forming with or without the addition of plasticizers and film-consolidation agents. The polymers are contained in the dispersion in an uncross-linked form. The cross-linking only takes place during the film formation process, partially already at room temperature within a few hours. Cross-linked copolymer films from the dried dispersion have a high resistancy to water and solvents and a very low melting index compared to films from the dried dispersion without cross-linking agents.

The aqueous copolymer dispersions contain copolymers consisting of from 50 to 99.9% by weight of at least one vinyl ester of a saturated aliphatic mono-carboxylic acid having from 1 to 18 carbon atoms, for example vinyl acetate, vinyl propionate, vinyl isobutyrate, vinyl esters of a branched saturated aliphatic monocarboxylic acid having from 9 to 11 carbon atoms, vinyl laurate or vinyl stearate, preferably vinyl acetate. The copolymers contain as reactive monomer from 0.1 to 15% by weight, preferably from 0.5 to 10% by weight of a n α-haloalcane carboxylic acid vinyl ester of formula (I) incorporated by polymerization, for example, mono-,di- or trihaloacetic acid vinyl esters or α-halopropionic acid vinyl esters, preferably monochloroacetic acid vinyl esters. The copolymers may further contain from 0 to 49.9% by weight of at least one further ethylenically unsaturated monomer incorporated by polymerization, such as olefines, for example ethylene of α-monoolefines having from 3 to 18 carbon atoms such as isobutylene, hexene(I) or octene(I), preferably ethylene; acrylic, methacrylic, maleic of fumaric acid esters of saturated monovalent aliphatic alcohols having from 1 to 8 carbon atoms such as n-butylacrylate, 2-ethylhexyl acrylate, methylmethacrylate, or di-n-butylmaleate; ethylenically unsaturated halohydrocarbons such as vinyl chloride or vinylidene chloride or nitrogen containing monomers such as acryl-amide or acrylonitrile. Small quantities of stabilizing monomers such as ethene sulfonates, acrylic or methacrylic acid may be used simultaneously.

The aqueous copolymer dispersions according to the invention may further contain from 0.5 to 10% by weight calculated on the copolymer of at least one emulsifier and/or a protective colloid. Suitable known emulsifiers are nonionic emulsifiers such as oxethylation products of alkyl phenols, aliphatic alcohols or aliphatic carboxylic acids or block polymers of ethylene oxide and propylene oxide, further an ionogenic emulsifiers such as alkylaryl sulfonates alkyl sulfates or sulfosuccinic acid esters. Examples of suitable protective colloids are known water-soluble polymers such as hydroxyethyl cellulose, carboxymethyl cellulose, copolymers of the N-vinyl methyl acetamide, polyvinyl pyrrolidone or polyvinyl alcohol.

Dispersions free from emulsifiers or protective colloids may be prepared as well in known manner by using higher amounts of hydrophilic monomers such as acrylamide or acrylic acid or of alkali persulfates as initiators.

The dispersions according to the invention may further contain plasticizers such as dibutyl phthalate or benzylbutyl phthalate in an amount of from 0 to 20% by weight calculated on the copolymer. Solvents, film forming auxiliaries, defoaming agents, preservatives and other auxiliaries may also be present in small quantities.

Examples of cross-linking agents to be added to the aqueous copolymer dispersions according to the invention are aminoplast resins such as plasticized or non plasticized urea formaldehyde resins or melamine formaldehyde, resins being optionally etherified partially or completely, moreover acylic polyamines such as diethylene triamine, triethylene tetramine, tetramethylene diamine, or hexamethylene tetramine, cyclic polyamines such as tricrotonylidene tetramine or hexamethylene tetramine, polyamidoamines or mixtures of formaldehyde and ammonia and/or amines in an amount of from 0.05 to 10% by weight, preferably 0.5 to 5% calculated by weight on the total mixture. Hexamethylene tetramine is used preferably. The addition may be effected immediately after the preparation of the aqueous copolymer dispersion or prior to its processing. In this process the cross-linking agent is added to the aqueous copolymer dispersion as such or in the form of an approximately 1 to 10% aqueous solution. Cross-linking does not take place when the aqueous dispersion is first mixed with the cross-linking agent; the mixtures are stable over a relatively long period of time. The cross-linking is effected only during the film forming process and may be accelerated by drying the copolymer films at higher temperatures. The cross-linked films are colorless or weakly colored depending on the cross-linking agent used and on the cross-linking temperature. Colorless cross-linked polymer films are obtained especially when using hexamethylene tetramine. The amount of cross-linking of the films may be easily determined by measuring the melt index as well as by the insolubility of the films in various solvents.

The copolymer dispersions according to the invention are prepared by the known polymerization of the monomers in an aqueous emulsion in the presence of free radical initiation. Polymerization may be carried out in a batch process, or by feeding the monomers as such or in an aqueous emulsion to the reaction medium. In the batch process all ingredients are placed in the reaction vessel and polymerization is started by heat or by the addition of a catalyst. When the polymerization is carried out by feeding the monomers to the reaction medium, the aqueous phase is placed in the reaction vessel and the predominant amount of monomers is fed to the aqueous phase over a certain period of time. When the polymerisation is carried out by feeding the monomers in the form of an aqueous emulsion, the main part of water is placed in the reaction vessel and the monomers are emulsified in the remainder of water and the emulsion is fed to the reaction vessel. These processes may also be used for the preparation of ethylene-containing copolymer dispersions. In this case polymerisation can be carried out at a constant, an increasing or a decreasing ethylene pressure of from about 5 to about 150 atmospheres gauge.

The aqueous copolymer dispersions have a polymer content of from 30 to 70% by weight calculated on the dispersion. They are especially suitable for preparing films on metals, paper, wood, plastic material and brickwork or as a pigment binding agent in coating compositions and in building materials, as a binding agent for woven or non-woven fibre materials as well as for special adhesives, for example, for furniture covering sheets or for flocking processes.

The following examples serve to illustrate the invention.

EXAMPLE 1

A polymerization mixture consisting of the following components was introduced into a 30 liter stainless steel autoclave provided with an anchor stirrer:
 144 g of oxethylated nonylphenol with 30 moles of ethylene oxide per mole of nonylphenol
 21.6 g of sodium ethene sulfonate solution (25%)
 15 g of sodium acetate
 54 g of polyvinyl alcohol having a saponification index of 88 mol % and a viscosity of the 4% aqueous solution of 18 centipoises at 20° C and
 2500 g of water.

After heating the solution to 70° C, 10% of a monomer mixture of 2.7 kg of vinyl acetate and 0.3 kg of monochloroacetic acid vinyl ester were rapidly added and an ethylene pressure of 20 atmospheres gauge was established in the autoclave. Thereafter the remaining quantity of the monomer mixture and a catalyst solution of 18 g of ammonium persulfate in 0.8 kg of water were introduced at a uniform rate by pumping and the resulting mixture was reacted at 80° C for two hours, the pressure of 20 atmospheres gauge being maintained. The reaction product obtained was a homogeneous stable aqueous 50% by weight dispersion of vinyl acetate/monochloroacetic acid vinyl ester/ethylene copolymer, the polymer portion of which had an ethylene content of about 10% by weight. The dispersion was poured onto glass plates, the thickness of the wet film being about 0.5 mm and then dried at room temperature for 1 to two days. A dried polymer film of the dispersion was soluble in organic solvents such as dimethyl sulfoxide, trichloroethylene and acetone after storage at room temperature and tempering at 100° C. The melt index of the film $I^{120°}\,C_{21.6}$ was 100 g/10 min. By adding to the starting dispersion having a pH value of about 5 or to the dispersion, the pH of which had been adjusted to a value of about 7 by ammonia or a sodium hydroxyde solution, hexamethylene tetramine in an amount of 10 g of a 10% aqueous solution to 100 g of the dispersion, cross-linked colorless films were obtained after drying at room temperature. The films were insoluble in the aforesaid organic solvents, the $I^{120°}\,C_{21.6}$ value was less than 0.1 g/10 min.

EXAMPLE 2

From 7 to 10 parts by weight of a 10% aqueous solution of hexamethylene diamine were added to 100 parts by weight of a copolymer dispersion of vinyl acetate/monochloracetic acid vinyl ester/ethylene prepared according to example 1 and the pH of which was adjusted to a value of 7 ammonia. The film resulting from the dispersion as cross-linked and insoluble in organic solvents such as acetone and dimethyl sulfoxide after drying and tempering it at 80° C for 4 hours. The $I^{120°}C_{21.6}$ was less than 0.1 g/10 min.

EXAMPLE 3

An aqueous dispersion of vinyl acetate/vinyl chloride/monochloroacetic acid vinyl ester/ethylene was prepared in an analogous manner to example 1 by the addition of 2.55 kg of vinyl acetate, 0.3 kg of vinyl chloride and 0.15 kg of monochloroacetic acid vinyl ester at an ethylene pressure of 20 atmospheres gauge. The dispersion had a solids content of about 50% by weight, the ethylene content of the polymer being about 9%. The film obtained from the dispersion was not cross-linked. A cross-linked polymer film having a melting index of $I^{120°}C_{21.6}$ of less than 0.1 g/10 min. was obtained by adding 10 parts by weight of a 10% aqueous solution of hexamethylene tetramine to 100 parts by weight of the dispersion and by pouring the mixture onto a glass plate in a layer having a thickness of 0.5 mm.

EXAMPLE 4

10 Parts by weight of a 40% aqueous solution of formaldehyde and the eqivalent quantity of an aqueous 25% ammonia solution were added subsequently to 100 parts by weight of a copolymer dispersion of vinyl acetate/monochloroacetic acid vinyl ester/ethylene prepared according to example 1. The dried colorless polymer film obtained from this mixture was no longer soluble in acetone and had a melting index $I^{120°}C_{21.6}$ of less than 0.1 g/10 min.

EXAMPLE 5

An aqueous 50% by weight copolymer dispersion of vinyl acetate and monochloroacetic acid vinyl ester was prepared in a monomer proportion of 97 : 3. The dried polymer film of the dispersion was soluble in acetone, the melt index $I^{120°}C_{21.6}$ was at 50 g/10 min. After adding 20 g of a 10% aqueous solution of hexamethylene tetramine to 100 g of the dispersion adjusted to a pH of 7, the film obtained was cross-linked, no longer soluble in acetone and had a melt index $I^{120°}C_{21.6}$ of less than 0.1 g/10 min.

EXAMPLE 6

A 50% by weight aqueous copolymer dispersion of vinyl acetate/monochloroacetic acid vinyl ester/di-n-butylmaleate in a monomer proportion of 59 : 2 : 39, the film of which was soluble in acetone, was cross-linked by adding 10 g of a 10% aqueous solution of hexamethylene tetramine to 100 g of the dispersion. The colorless film obtained from the dispersion could no longer be dissolved in acetone. The melt index $I^{120°}C_{21.6}$ was less than 0.1 g/10 minutes.

EXAMPLE 7

100 g of a 50% by weight aqueous copolymer dispersion of vinyl acetate/monochloroacetic acid vinyl ester/acrylic acid-n-butyl ester in a monomer proportion of 65 : 5 : 30 were cross-linked by adding 5 g of a 10% aqueous solution of hexamethylene tetramine. The film obtained from the dispersion previously soluble in acetone was no longer soluble after the addition of amines. The $I^{120°}C_{21.6}$ was below 0.1 g/10 minutes.

EXAMPLE 8

A 50% by weight aqueous dispersion of a copolymer of vinyl acetate, mono-chloroacetic acid vinyl ester and the vinyl ester of a branched saturated monocarboxylic acid having about 10 carbon atoms in a monomer proportion of 62 : 5 : 34 was used. The dried polymer film of this dispersion was soluble in acetone and the melt index $I^{120°}C_{21.6}$ of the film was 50 g/10 min. After adding 20 g of a 10% aqueous solution of hexamethylene tetramine to 100 g of the dispersion the film was no longer soluble and the melting index $I^{120°}C_{21.6}$ of the colorless film was less than 0.1 g/10 min.

EXAMPLE 9

(a) Preparation of a copolymer dispersion of vinyl acetate/monochloroacetic acid vinyl ester/ethylene having a higher ethylene portion A polymerization liquor adjusted to a pH value of 5 and consisting of 5700 g of water, 44 g of the oxethylation product of 1 mole of stearyl alcohol and 20 moles of ethylene oxide, 115 g of polyvinyl alcohol, the 4% aqueous solution of which had a viscosity of 18 centipoises and a saponification index of 88 mol %, 15 g of water-free sodium acetate and 12.5 g of sodium disulfite was introduced into a 30 liter pressure reaction vessel provided with a temperature regulator and an agitator. The reactor was flushed with nitrogen and ethylene in order to remove essentially all the oxygen. The agitator was then adjusted to 150 revolutions per minute, 790 g of a mixture of 24 g of monochloro-acetic acid vinyl ester and 766 g of vinyl acetate were then added, the contents of the vessel were heated to 60° C and a solution of 6 g of ammonium persulfate in 175 g of water was added. Ethylene was added during the heating process until a pressure of 45 atmospheres gauge was obtained. After the polymerization had started, a mixture of 205 g. of monochloroacetic acid vinyl ester and 6880 g of vinyl acetate, a solution of 190 g of polyvinyl alcohol, the 4% aqueous solution of which had a viscosity of 18 centipoises and a saponification index of 88 mol % in 2000 g of water and a solution of 14.4 g of ammonium persulfate in 420 g of water was added over a period of 6 hours a reactor temperature of 60° C. After finishing said addition a solution of 3.6 g of ammonium persulfate in 105 g of water was added to the mixture and the whole was heated for 1.5 hours at an temperature of 75° C. The ethylene addition was then stopped. After cooling, a 55% by weight copolymer dispersion of vinyl acetate/monochloroacetic acid vinyl ester/ethylene was obtained having a latex viscosity of 12 poises, an average particle size of about 0.9 μ and the polymer of which had an ethylene content of about 20% by weight. The properties of the dispersion film are shown in table 1.

(b) Combination of the copolymer dispersion of vinyl acetate/monochloroacetic acid ester/ethylene with cross-linking substances Various substances acting as cross-linking agents were added to the copolymer dispersion in a pure form or in the form of their aqueous solutions. Films were cast from said combination and their properties, for example, the melt index $I^{120°}C_{21.6}$ were determined after tempering at room temperature and at 100° C. The results obtained with the dispersions of examples 9 to 12 and of the comparative examples 1 and 2 are indicated in table 1. When determining the melt indices, the polymers free from additives of examples 9 to 12 and of the polymers contaning cross-linking agents of the comparative examples 1 and 2 flow out of the vessel homogeneously, a cross-linkage could not be noticed. Copolymers of the dispersions according to the invention showed a completely different behaviour after combining them with cross-linking agents. When measuring the melt indices the material leaving the apparatus was no longer homogeneous, but rather was in the form of consolidated fragments as in the case of cross-linked products. When adding melamine resins the cross-linking was evidently effected during the measurement, since the amounts leaving the vessel in this process got smaller and smaller. The cross-linking by hexamethylene tetramine is especially advantageous. The cross-linking was evident not only in the determination of the melt index, but also by solubility tests. While copolymer films from the dispersions according to the invention without any addition were soluble in dimethyl formamide, insoluble films were obtained when adding cross-linking agents.

(e) Preparation of adhesives for PVC sheets on beech-wood

The copolymer dispersions and combinations of the copolymer dispersion with various cross-linking agents were used for preparing bonding materials for PVC sheets for furniture and beech wood. Unconditioned and conditioned dispersions were used as adhesives. The confection was carried out as follows: 100 parts by weight of the 50% by weight dispersion were introduced by stirring into a previously formed pasty mixture of 45 parts by weight of gypsum and 15 parts by weight of water. After vigorously stirring for 5 minutes a solution of 5 parts by weight of colophony in 5 parts by weight of toluene was slowly introduced by stirring into said mixture. After standing for 24 hours, the adhesion of the PVC rigid sheets having a breadth of 2.5 cm was effected on beech wood. After conditioning the bonds for 4 days at 23° C and an atmospheric relative humidity of 50% of the resistance of the bonds to peeling was determined at varying temperatures and pullling speeds by means of a tensile strength apparatus (table 2). The resistance to peeling of the bonds when using the dispersions according to the invention without addition and of the comparative dispersion with or without addition and when using the unconditioned dispersion were at 0.7 kp/2.5 cm and at 0.4 kp/2.5 cm when using the conditioned dispersion. These data could be improved by adding the cross-linking agents to the dispersions according to the invention for example partially by more than 300%, especially by adding hexamethylene tetramine.

EXAMPLE 10

The aqueous copolymer dispersion was prepared as described in example 9a, but by using a different monomer mixture and by polymerizing at an ethylene pressure of 10 atmospheres gauge. A mixture of 764 g of vinyl acetate and 38 g of monochloroacetic acid vinyl ester was added to the aqueous polymerization mixture at room temperature, and a mixture of 6880 g of vinyl acetate and 344 g of monochloroacetic acid vinyl ester was introduced by pumping over a period of 6 hours after the polymerization had started. A stable 55% by weight dispersion was obtained having a latex viscosity of 19 poises and the polymer portion of which had an ethylene content of about 5% by weight.

COMPARATIVE EXAMPLE 1

The dispersion was prepared as described in example 9a) but without using monochloroacetic vinyl ester. Firstly 764 g of vinyl acetate were added to the aqueous polymerization liquor at room temperature and then 6880 g of vinyl acetate were added to the polymerization mixture over a period of six hours. A 55% by weight aqueous copolymer dispersion of vinyl acetate/ethylene as obtained having a latex viscosity of 28 poises.

EXAMPLE 11

A polymerization reaction mixture adjusted to a pH value of 5 and consisting of 9200 g of water and 247 g of polyvinyl alcohol, the 4% aqueous solution of which had a viscosity of 18 centipoises and a degree of saponification of 88 mol %, 15 g of anhydrous sodium acetate and 12.5 g of sodium bisulfite were introduced into the reaction vessel described in example 1. The reactor was flushed with nitrogen and ethylene, thereafter the agitator was adjusted to 150 revolutions per minute, 790 g of a mixture of 8 g of monochloroacetic acid vinyl ester and 764 g of vinyl acetate was added. The contents of the vessel were then heated to 60° C and a solution of 6 g of ammonium persulfate in 250 g of water was added. Ethylene was then introduced during the heating process until a pressure of 45 atmospheres was obtained and after the polymerization had started 68 g of monochloroacetic acid vinyl ester and 6880 g of vinyl acetate and a solution of 14.4 g of ammonium persulfate in 600 g of water was added over a period of 6 hours at an inner temperature of 60° C and an ethylene pressure of 45 atmospheres gauge. When the addition had ended a solution of 3.6 g of ammonium persulfate in 150 g of water was added to the mixture and the whole was heated for 1.5 hours at an inner temperature of 75° C. The ethylene feed was stopped and after cooling a 50% by weight copolymer dispersion of vinyl acetate/monochloroacetic acid vinyl ester/ethylene was obtained having a latex viscosity of 15 poises, an average particle size of about 1 $\mu$ and the polymer of which had an ethylene content of about 21% by weight.

EXAMPLE 12

The aqueous copolymer dispersion was prepared in an analogous manner to example 11, but by carrying out the polymerization with a modified monomer mixture at an ethylene pressure of 5 atmospheres. A mixture of 764 g of vinyl acetate and 76 g of monochloroacetic acid vinyl ester was added to the polymerization mixture at room temperature and after the polymerization had started a mixture of 6880 g of vinyl acetate and 688 g of monochloroacetic acid vinyl ester was introduced by pumping over a period of 6 hours. The dispersion obtained of a copolymer of vinyl acetate/monochloroacetic acid vinyl ester/ethylene had a solids content of 51% by weight and a latex viscosity of 23 poises.

Comparative Example 2

The dispersion was prepared as in example 11 but without using monochloroacetic acid vinyl ester. 764 g of vinyl acetate were added to the aqueous polymerization liquor at room temperature and 6880 g of vinyl acetate were added for a period of 6 hours. A 50% by weight copolymer dispersion of vinyl acetate/ethylene was obtained having a latex viscosity of 19 poises.

TABLE 1:

Melting indices of copolymer films

| dispersion of example | cross-linking additive kind* | quantity (g) calculated on 100 g of solid matter of the dispersion | melting index $I_{21.6}^{120°C}$ (g/10 min.) tempering at 20° C | tempering at 100° C for a period of 12 hours |
|---|---|---|---|---|
| 9 | — | — | 44 | 25 |
| 9 | A | 2.7 | 0.02 | 0.01 |
| 9 | A | 5.4 | 0.01 | 0.01 |
| 0 | B | 0.5 | 0.12/0.04/0.01 | |
| 9 | C | 0.5 | 2.9/1.2/0.6 | 0.04 |
| 9 | D | 0.5 | 1.2/0.6/0.3 | 0.08 |
| 10 | A | 2.7 | 0.01 | 0.01 |
| comparative example 1 | — | — | 3.5 | 2.3 |
| comparative example 1 | A | 2.7 | 4,2 | 2.7 |
| comparative example 1 | B | 0.5 | 3.2 | 1.2 |
| 11 | — | — | 2 | 8.8 |
| 11 | A | 2.7 | 0.01 | 0.1 |
| 1 | B | 0.5 | 0.2/0.1/0.03 | 0.03 |
| 12 | — | 30 | 25 | |
| 12 | A | 5.4 | 0.3 | 0.1 |
| comparative example 2 | — | — | 2.5 | 2.3 |
| comparative example 2 | D | 1.5 | 3.6 | 1.9 |

*) A = hexamethylene tetramine,
B = partially etherified tetramethylol melamine - condensation product having 2.5 methyl ether groups per mol of melamine,
C = melamine-formaldehyde condensation product of 1 mol of melamine and 2.6 moles of formaldehyde,
D = pentamethylol melamine tetramethyl ether

TABLE 2:

Resistance to peeling of bondings of PVC sheets on beech wood

| dispersion of example | cross-linking additive kind*) | quantity (g) calculated on 100 g of solid matter of the dispersion | resistance to peeling at 70° C and 0.1 cm/min. pulling speed/kp/2.5 cm pure dispersion | confected dispersion |
|---|---|---|---|---|
| 9 | — | — | 0.7 | 0.4 |
| 9 | A | 2.7 | 1.4 | 1.3 |
| 9 | A | 5.4 | 1.5 | 1.6 |
| 9 | E | 3.5 | 1.2 | 1.1 |
| 9 | F | 2.0 | 1.5 | 0.9 |
| 9 | B | 0.5 | 0.9 | 0.7 |
| 10 | A | 2.7 | 1.3 | 1.4 |
| comparative example 1 | — | — | 0.65 | 0.3 |
| comparative example 1 | A | 2.7 | 0.7 | 0.3 |
| 11 | A | 2.7 | 1.6 | 1.3 |
| 11 | G | 1.8 | 1.3 | 1.3 |
| 12 | — | — | 0.6 | 0.25 |
| 12 | A | 5.4 | 1.7 | 2.2 |
| 12 | D | 1.5 | 0.9 | 0.6 |
| comparative example 2 | — | — | 0.7 | 0.4 |
| comparative example 2 | A | 2.5 | 0.65 | 0.35 |

*) A = hexamethylene tetramine
B = partially etherified tetramethylol melamine-condensation product having 2.5 methyl ether groups per mol of melamine
D = pentamethylol melamine tetramethyl ether
E = diethylene triamine
F = mixture of a polyamidoamine modified by an aliphatic glycidyl ether and the reaction product of an araliphatic diamine with formaldehyde and phenol
G = tetramethene diamine

What is claimed is:

1. An aqueous copolymer dispersion containing from 70% to 30% by weight of water and from 30% to 70% by weight of a copolymer of from 50 to 99.9% by weight of at least one vinyl ester of a saturated aliphatic monocarboxylic acid having from 1 to 18 carbon atoms, 0.1 to 15% by weight of an α-haloalkane carboxylic acid vinyl ester of the formula

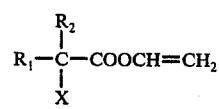

wherein $R_1$ represents hydrogen, halogen or an alkyl radical having from 1 to 16 carbon atoms, $R_2$ represents hydrogen, halogen or an alkyl radical having from 1 to 3 carbon atoms and X represents halogen, from 0 to 49.9% by weight of at least one further ethylenically unsaturated monomer selected from mono-olefin having 2 to 18 carbon atoms; acrylic, methacrylic, maleic and fumaric acid esters of saturated monovalent alcohols of 1 to 8 carbon atoms; vinyl chloride, vinylidene chloride, acrylamide and acrylonitrile, and from 0.05 to 10% by weight, based on the total weight of the dispersion of a cross-linking agent selected from the group consisting of aminoplast resins, polyamines, polyamidoamines, a mixture of formaldehyde and amine, a mixture of formaldehyde and ammonia and a mixture of formaldehyde, ammonia and amine.

2. A dispersion according to claim 1 wherein the cross-linking agent is from 0.1 to 10% by weight of hexamethylene tetramine.

3. An aqueous dispersion containing from 70% to 30% by weight of water and from 30% to 70% by weight of a copolymer of 50 to 99.9% by weight of vinylacetate, 0.1 to 15% by weight of vinylchloroacetate, and 0 to 49% by weight of ethylene and from 0.1 to 10% by weight, based on the total weight of dispersion, of a cross-linking agent which is a polyamine.

4. A dispersion according to claim 3 wherein the cross-linking agent is hexamethylene tetramine.

* * * * *